W. B. DUNBAR.
VARIABLE SPEED PULLEY.
APPLICATION FILED MAR. 11, 1918.
1,314,580.
Patented Sept. 2, 1919.
4 SHEETS—SHEET 1.
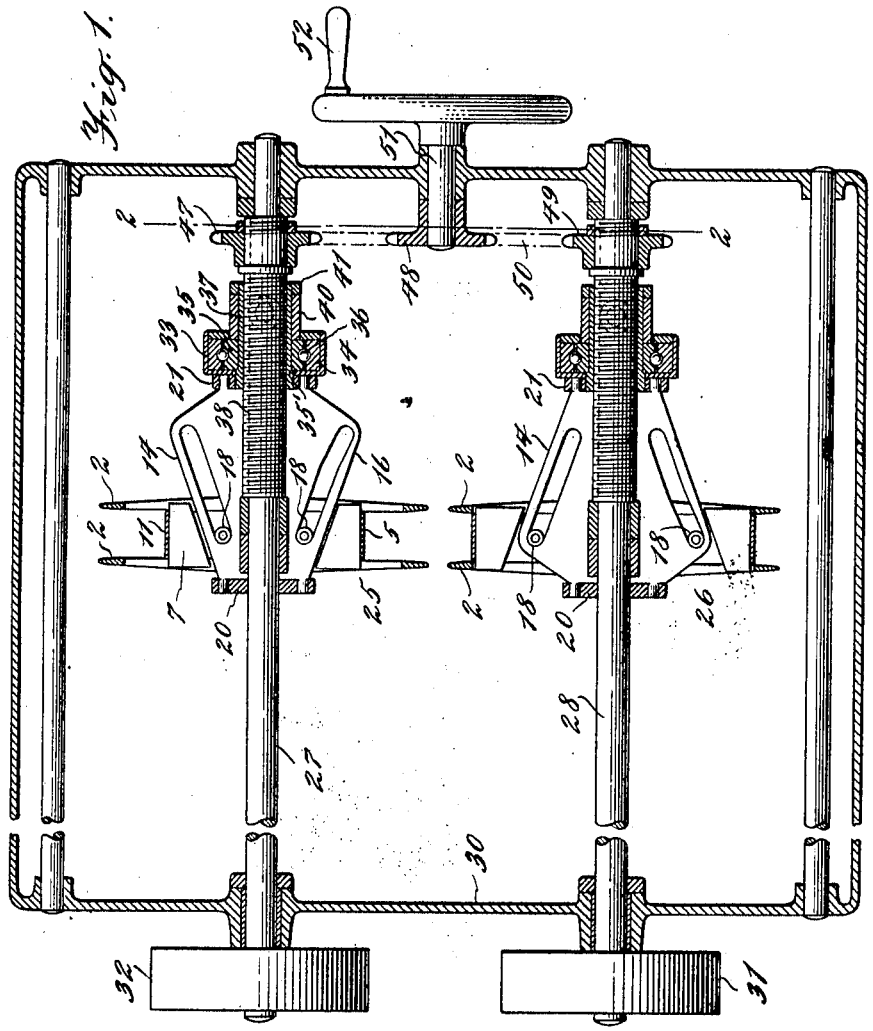
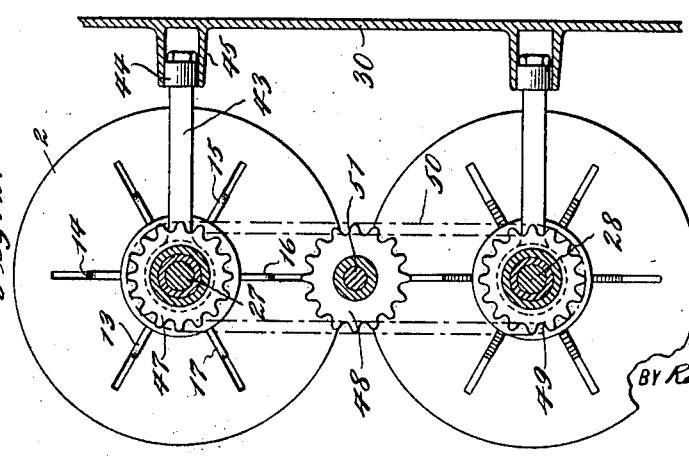
INVENTOR
William B. Dunbar
BY Rosenbaum Stockton
& Roret.
ATTORNEYS

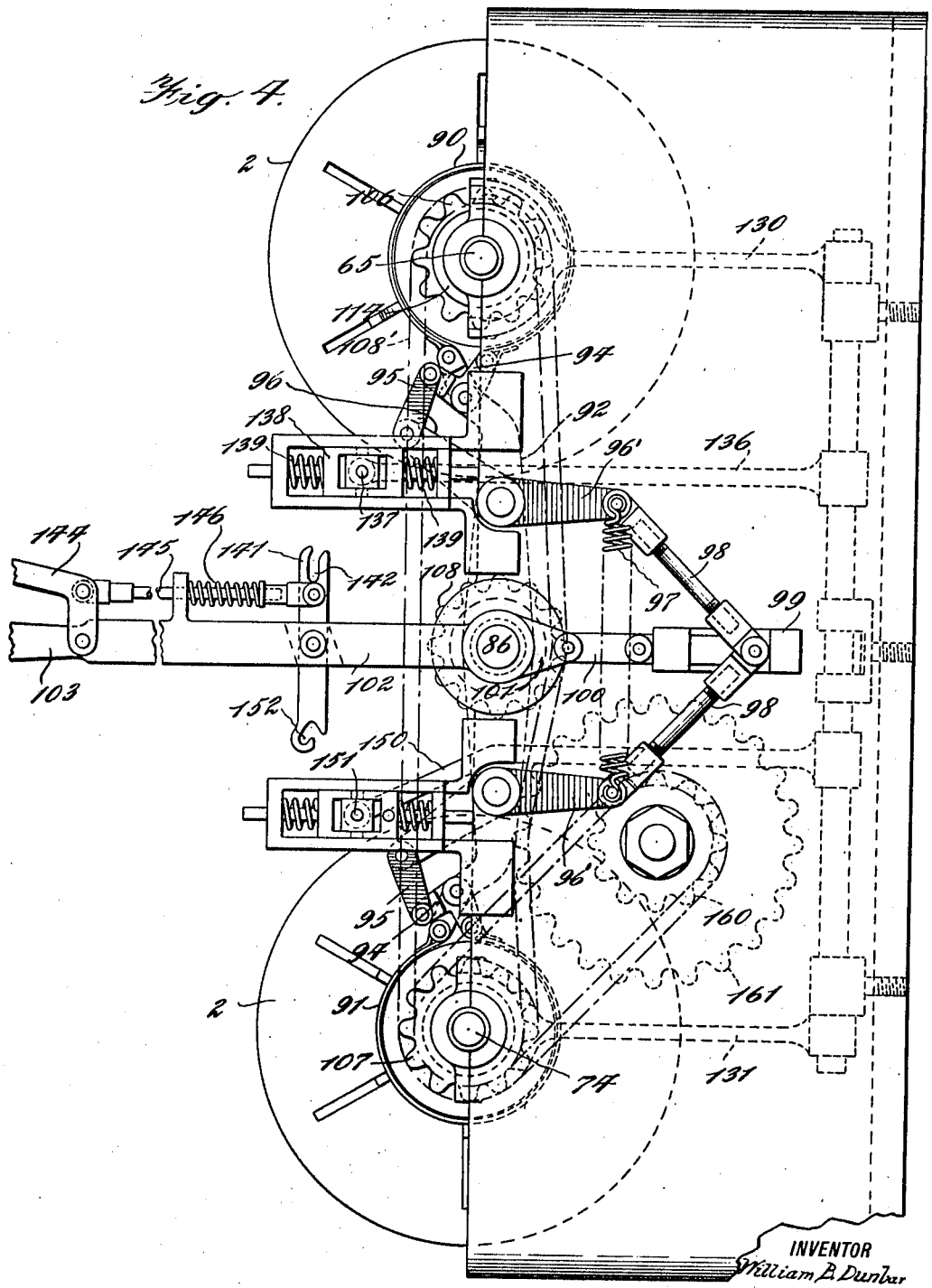

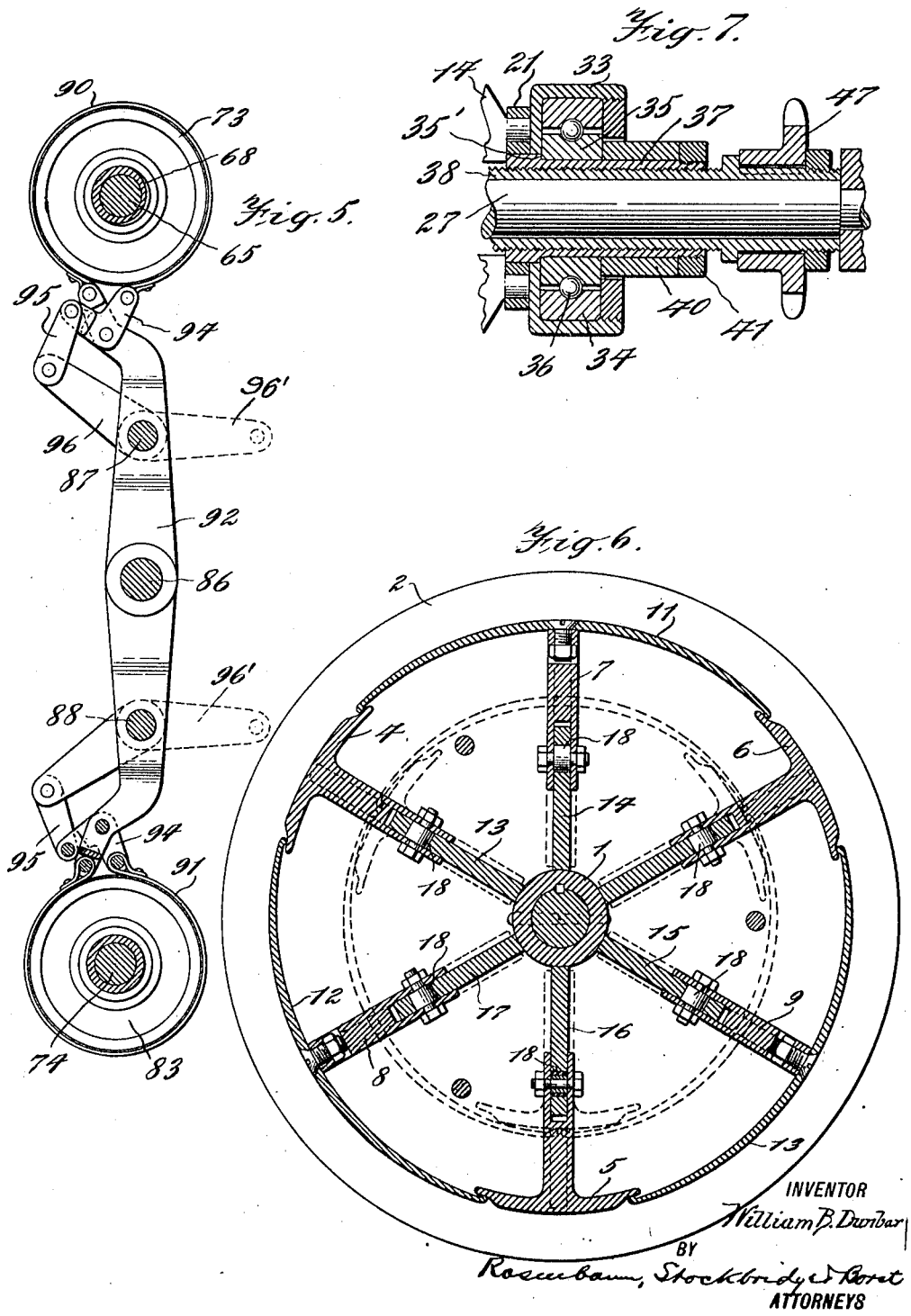

UNITED STATES PATENT OFFICE.

WILLIAM BUYERS DUNBAR, OF ASHFIELD, NEAR SYDNEY, NEW SOUTH WALES, AUSTRALIA.

VARIABLE-SPEED PULLEY.

1,314,580.  Specification of Letters Patent.  Patented Sept. 2, 1919.

Application filed March 11, 1918. Serial No. 221,653.

*To all whom it may concern:*

Be it known that I, WILLIAM BUYERS DUNBAR, a subject of the King of Great Britain, residing at Ashfield, near Sydney, in the State of New South Wales and Commonwealth of Australia, have invented certain new and useful Improvements in Variable-Speed Pulleys, of which the following is a full, clear, and exact description.

This invention relates to variable speed pulleys and more particularly to pulleys whose diameters are expanded or contracted by means of vanes or fins which move longitudinally along the shaft to which the hub and flanges of the pulley are fastened.

The general object of the invention is to provide an improved operating mechanism for pulleys of this character, which operating mechanism will permit of the simultaneous movement of the fins or vanes, so that one pulley may be expanded and the other contracted equal amounts, to thereby maintain the belt tight.

More specifically stated, one object of the invention is to provide an operating mechanism for pulleys of this character, which operating mechanism is so constructed that it will take up the end thrust which is placed upon the fins or vanes, due to their pin and inclined slot connection with the segments of the pulleys.

It is also an object of the invention to provide an operating mechanism which is automatically actuated when a lever or other operating arm is manually displaced, the automatic operating mechanism being so constructed that the parts of the operating mechanism must be actuated in a certain order or sequence, which will in a large measure prevent any breakage of the parts of the operating mechanism.

Other objects of the invention will be hereinafter apparent from the detailed description, when taken in conjunction with the accompanying drawings, the invention consisting of the combinations and constructions disclosed and particularly pointed out in the appended claims.

In the drawings,

Figure 1 shows a front elevation of a simple form of operating mechanism, associated with a pair of variable speed pulleys;

Fig. 2 is a section of Fig. 1, substantially on the line 2—2;

Fig. 4 is an end view of the construction disclosed in Fig. 3;

Fig. 5 is a detail of the brake mechanism;

Fig. 6 is a detail showing the expansible pulleys, and

Fig. 7 is a detail of the anti-friction bearing, which is connected to the vanes.

Figure 3:
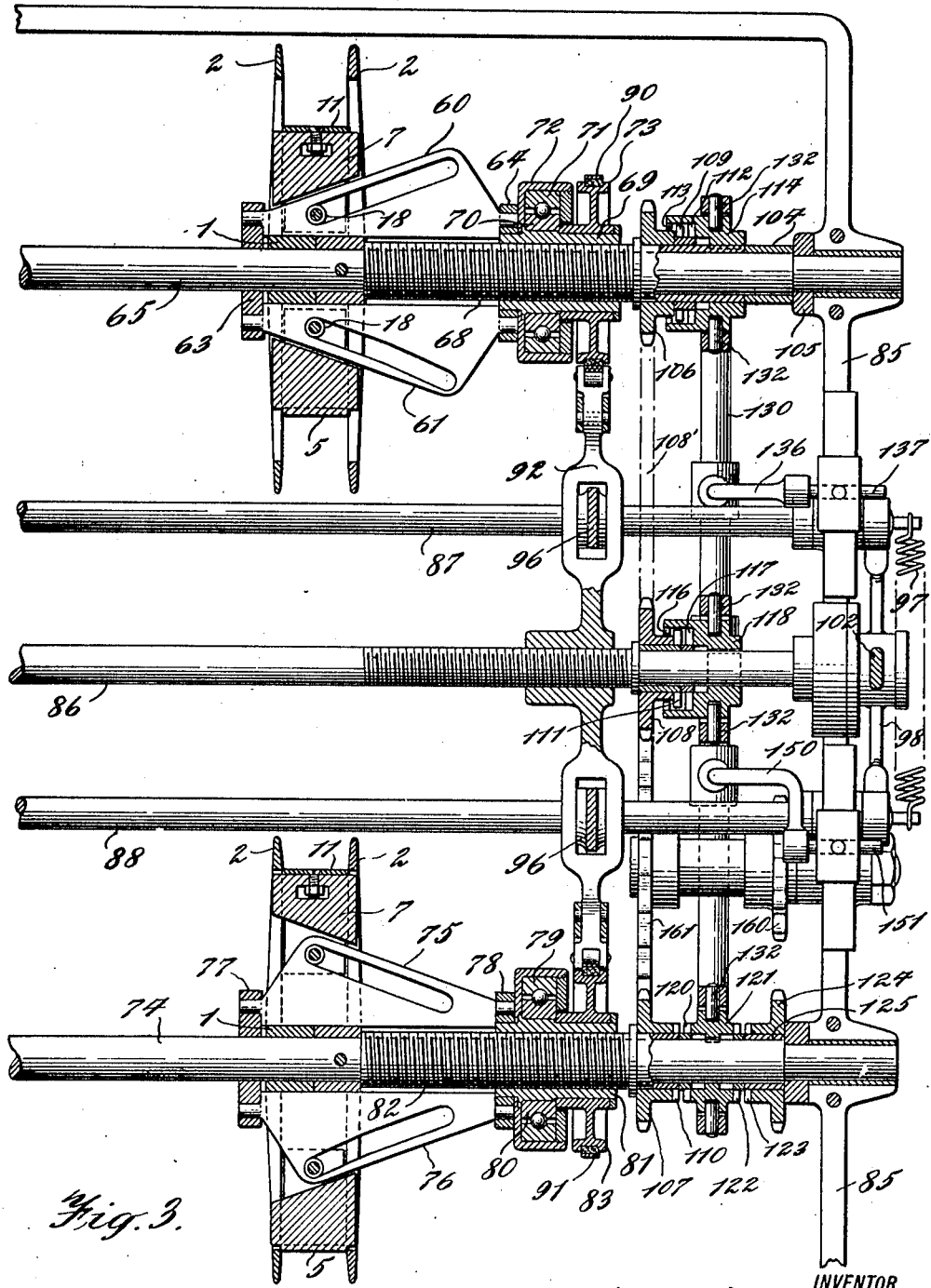
Fig. 3 is a side elevation of a modified form of construction, parts being shown in section for the sake of clearness.

Referring first to Figs. 1, 3 and 6, the type of expansible pulley utilized is of a similar construction to that disclosed in my prior Patent No. 1,173,787, dated February 29, 1916, the pulley consisting of a hub 1 which carries two disks 2, which form the side faces and flanges of the pulley. Fitting between the two disks or flanges 2 are a plurality of segment-shaped parts whose curved outer surfaces form the circular face of the pulley. These parts consist of arms or spokes which carry segmental-shaped pieces 4, 5 and 6 at their outer ends and arms or spokes 7, 8 and 9, which carry arcuate-shaped resilient strips 11, 12 and 13, the ends of these arcuate pieces engaging the ends of the pieces 4, 5 and 6, when the pulley is in expanded position to provide a smooth circular face, over which the belt passes. These expansible sections of the pulley are expanded and contracted by means of vanes or fins 13 and 14, 15, 16 and 17. The vanes or fins pass through slots or recesses provided in the radial spokes or arms, which arms carry rollers 18 which ride in inclined-shaped slots in the vanes or fins, as clearly disclosed in Fig. 1. The vanes or fins are connected together at one end by a collar 20, which is adapted to slide loosely along the shaft upon which the pulley is mounted. The other ends of the vanes are also connected together by means of a similar collar 21. So far described, the construction is of a similar nature to that disclosed in my patent above referred to.

The essential feature of the present invention is to provide operating mechanisms for these fins, and referring first to Figs. 1 and 2 of the drawings, a simple embodiment of the invention is disclosed. In the construction disclosed therein the two pulleys which are designated 25 and 26 are mounted upon shafts 27 and 28, respectively, which shafts are suitably journaled in a frame 30. A belt (not shown) passes over these pulleys in the usual manner. Each of the pulleys is provided with longitudinally movable fins or vanes, as described, which, by their longitudinal movement change the relative diameters of the two pulleys, to thus vary the relative speeds of the shafts 27 and 28. One of these shafts, as for example 28, may be the drive shaft, power being communicated to it by the pulley 31. The other of the shafts, namely 27, may be regarded as the driven shaft, and is adapted to drive any suitable power transmitting device by means of a pulley 32.

As has been described, the longitudinally movable vanes or fins which have the pin and inclined slot connection with the radially movable segments of the pulley are connected together at one end by the collar 21. This collar is in turn carried by means of a frame 33, which frame is secured to and forms a casing around the outer ring 34 of an anti-friction bearing, the inner ring of which has been designated 35, the two rings being separated by anti-friction devices or balls 36. The inner ring 35 of the anti-friction bearing is carried by a traveling nut 37, which is threaded upon a sleeve 38. The sleeve 38 loosely surrounds the shaft 27. The inner bearing ring 35 is prevented from lateral movement upon the traveling nut 37 by means of a collar 40, which is held in place by a threaded collar 41, which forces the ring 35 against the shoulder 35' of the nut. The parts 35, 37, 40 and 41 therefore constitute a unitary structure and move with the traveling nut 37. Extending rearwardly from the collar 40 is an arm 43 which carries at its rear end a roller 44 adapted to ride between guideways 45 which extend longitudinally along the rear of the frame 30. The longitudinal vanes of the pulley 26 mounted upon the shaft 28 are identical in construction to those of the pulley 25, the only difference being that the slots in the vanes of the two pulleys are inclined in opposite directions. Mounted upon the sleeve 38 adjacent one end is a sprocket wheel 47, which sprocket wheel is connected to sprocket wheels 48 and 49 by means of a chain 50, the sprocket wheel 49 being carried by the sleeve surrounding the shaft 28. The sprocket wheel 48 is carried by a stud shaft 51, which is provided with a hand wheel 52 extending exteriorly of the casing, for rotating the same.

The method in which this mechanism operates is obvious from the preceding description, but will be briefly described. When the hand wheel 52 is rotated the sprocket wheels 47 and 49 drive the respective sleeves which are secured thereto, which sleeves rotating within the traveling nuts 37 will advance the latter along the shafts, it being obvious that the nuts 37 are prevented from rotation by the arms 43 and their coöperating rollers 44 and guideways 45. The movement of the nuts 37 along the shafts will cause a similar movement to be imparted to the fins or vanes to change the relative diameters of the two pulleys, the upper pulley being expanded and the lower pulley being contracted.

It is to be noted that during this movement of the pulleys the fins or vanes are free to rotate, since the collar 21 is connected to the outer ring 34 of the anti-friction bearing. It is also to be noted that the thrust which is imparted to the fins or vanes while the segments are being operated and also during the normal operation, due to their inclined pin and slot connection with the segments of the pulley, is taken up by the bearing consisting of the rings 34 and 35 and the intervening balls 36, since the sleeve 38, to which the inner or stationary part of the bearing is secured, bears against the bearing for the shaft 27. In the same manner, the bearing on the shaft 28 takes the thrust load since the sleeve 38 bears against the hub of the pulley mounted on this shaft.

Another embodiment of the invention is disclosed in Figs. 3, 4 and 5. In this form, the longitudinal movement of the vanes or fins is accomplished by automatic mechanism. Referring first to Fig. 3, it will be seen that in this figure the vanes or fins 60 and 61 are connected at one end by a collar 63 and at the other end by a collar 64. Surrounding the shaft 65 upon which the pulley is mounted, is a sleeve 68 which is of a construction similar to the sleeve 38 in the other form. This sleeve is also threaded and carries a traveling nut 69, which nut carries the inner ring 70 of the ball bearing. The outer ring of the ball bearing, namely 71, is secured to the collar 64 by means of a casing 72, the bearing being similar to the one already described in conjunction with Figs. 1, 2 and 7. The nut 69 also carries a brake wheel 73. The other pulley is mounted upon a shaft 74 and is provided with vanes 75 and 76 which are of similar construction to the vanes 60 and 61, with the exception that they are inclined in the opposite direction. These vanes are connected at their ends to collars 77 and 78, the collar 78 being secured to the outer ring 79 of the bearing, the inner ring of which is designated 80, which inner ring is mounted upon a traveling nut 81 mounted upon a threaded sleeve 82. The sleeve 81 also carries a brake wheel 83, the brake wheel 83, nut 81 and inner ring 80 of the bearing constituting a unitary structure which is similar to the nut 69, brake wheel 73 and inner bearing ring 70 of the other pulley. The shafts 65 and 74 are journaled in a suitable frame 85, which frame also carries an intermediate rotatable shaft 86. Parallel to this intermediate shaft are two stationary shafts 87 and 88, which shafts as well as the shaft 86, are suitably secured at their ends to the frame 85. The brake wheels 73 and 83 are normally held against rotation by brake straps 90 and 91. One end of each of these brake straps is connected to the ends of a bar 92 (see Fig. 5), which is carried by the shaft 86 and the shafts 87 and 88, the arm 92 being loosely mounted upon these two latter shafts so that it may slide along the same. The other end of each of the straps is secured to a bell crank 94, these bell cranks being in turn connected by links 95 to cranks 96, which cranks are journaled upon the shafts 87 and 88 and are free to slide along the same. The ends of these shafts carry arms 96' which are connected together by a spring 97 and links 98, which links are connected to each other and to a sliding block 99. The block 99 is connected by a link 100 to the small arm 101 of a lever 102, which is provided with a handle 103 for turning the same. The swinging of this lever 102 up or down, as is shown in Fig. 4, will cause the links 98 which form a pair of toggle links to throw apart the ends of the arms 96' to which these links are attached, and through the bell cranks 94 exert a tension upon the brake bands, which will hold the brake wheels 73 and 83 stationary. These wheels are normally permitted to rotate, since the tension of the spring 97 is exerted to pull the ends of the bell cranks 96 together, and thus release the brake bands. In other words, during the normal operation of the mechanism the ball bearing and sleeve 69 rotate as a unit with the vanes 60 and 61. The threaded sleeve 68, which is loosely mounted upon the shaft 65 also during the normal operation of the device rotates with the vanes 60 and 61. The thrusts imparted by the pin and slot connection of the vanes is therefore taken up by the sleeves 68 and 82. The thrust of the sleeve 68 is in turn imparted to the frame 85 by means of the collar 104, which rests against a hardened bushing 105. In the same manner the thrust of the sleeve 82 is imparted to the hub of the pulley on the shaft 74.

Loosely mounted upon the sleeve 68 is a sprocket wheel 106, a similar sprocket wheel 107 being keyed to the sleeve 82. The intermediate rotary shaft 86 also carries a sprocket wheel 108 which is also loose upon the shaft 86. These three sprocket wheels are connected together by a chain 108. The sprocket wheels 106, 107 and 108 each carry clutch faces 109, 110 and 111, respectively. The clutch face 109 of sprocket wheel 106 is adapted to engage either the clutch face 112 or the clutch face 113, which clutch faces are carried by a suitable part 114 which is keyed to the sleeve 68. In the same manner the clutch face 111 of sprocket wheel 108 is adapted to engage either clutch face 116 or clutch face 117, which clutch faces are carried by a part 118 keyed to the shaft 86. The sprocket wheel 107 is provided with the clutch face 110 which is adapted to engage with the clutch face 120 upon a part 121, which is keyed to the shaft 74. The part 121 also carries a clutch face 122 which is adapted to engage a clutch face 123 carried by a sprocket wheel 124 which is loosely mounted upon the shaft 74 upon a sleeve 125. The parts 114, 118 and 121 are each adapted to be moved forward and backward to cause their respective clutches to engage with the clutches upon the sprocket wheels, this back-and-forth movement being given to these parts by a rock shaft 130, which carries arms 131 having yokes at their upper ends, which yokes are provided with pins 132 which fit into grooves in the parts 114, etc., the movement of these yokes causing a back-and-forth movement to be given to the parts when the rock shaft is oscillated. The rock shaft 130 is rocked in one direction by an arm 136 which carries a pin 137, which pin passes through a sliding block 138. Centralizing springs 139 return this block to its normal position. The pin 137 when moved will, through the lever 136, rock the shaft 130. This movement is given to the pin by means of a cross arm 141 which is pivoted to the hand lever 102 which actuates the brake straps, the cross arm 141 being provided with a slot 142 which receives the end of the pin 137. Pivoted to the hand lever 102 adjacent its handle 103 is a bell crank 144, which bell crank actuates a rod 145, which is connected to the cross arm 141, the cross arm being normally held in the position shown in Fig. 4 by a spring 146. When, however, the bell crank 144, the upper portion of which is not shown, is pressed by the hand against the handle 103, the rod 145 will be pulled upwardly and if the hand lever 102 has been moved so that the pin 137 is engaged within the recess 142 this upward movement of the pin 137 will throw the rock shaft 130 to place the clutches 109 and 132 into locking engagement, as also the clutches 111 and 116 and 120 and 119.

The rock shaft also carries a second rocking arm 150, which also carries a pin 151, which pin is surrounded by a sliding box and centralizing springs similar to the pin 137. The cross arm 141 is at its other end provided with a hook-shaped recess 152, which receives the pin 151 to throw the pin downwardly, which will cause the rock shaft 130 to be thrown in the opposite direction, and hence throw the clutches 113 and 109 at sprocket wheel 106 into rocking engagement and at the same time throw the clutches 116 and 111 at sprocket wheel 108 and the clutches 122 and 123 of sprocket wheel 124 into engagement.

The sprocket wheel 124 is adapted to be driven by means of a chain from a sprocket wheel 160, which is mounted upon an intermediate shaft, which shaft also carries a sprocket wheel 161 of larger diameter, which sprocket wheel engages the chain 108', the sprocket wheel 161 being driven in the opposite direction from sprocket wheels 107, 108 and 106, and hence the sprocket wheel 124 is also driven in the opposite direction. In the construction shown, the sprocket wheel 161 is shown as of larger diameter than the sprocket wheel 160, but these sprocket wheels may be made of the same diameter, if desired.

The operation of this modification will now be described. Under normal conditions the two pulleys are rotating upon their shafts 65 and 74 respectively, and the vanes 60 and 61 of one pulley, together with their collars 63 and 64, rotate as a unitary structure with the bearing formed of the bearing rings 70 and 71, and the nut 69 and sleeve 68. The brake wheels 73, etc., are free from their brake bands or straps, since the hand lever 102 is in its normal position, in which position the spring 97 exerts its tension to release the brake bands. Under these conditions, the thrust which is imparted to the vanes 60 and 61, due to their inclined pin and slot connection is carried by the sleeves 68 and 82, as described.

When it is desired to change the speed ratio of the two pulleys, the hand lever 102 is swung until either the recess 142 or 152 engages the pin 137 or the pin 151. Assuming first that the hand lever is thrown to engage the pin 137, before the recess 142 comes into engagement with the pin 137, the movement of the hand lever will draw upon the link 100 and through the toggle links 98 will cause a pressure to be placed upon the brake bands which will hold the brake wheels 73 and 83 stationary. This will also hold the sleeves 68 and 82 stationary and the vanes will rotate with the outer rings of the anti-friction bearings. Assuming now that the pin 37 is engaged in the recess 142 and the brake crank 144 is actuated to rock the shaft 130, this will cause the clutches 109 at 112 and sprocket wheel 106 to come into locking engagement and also the clutches 111 and 117 and sprocket wheel 108 at clutches 110 and 120 at sprocket wheel 107. Since the part 121 is keyed to the drive shaft 74, the sprocket wheels will then be rotated through the shaft 74. The rotation of sprocket wheel 107, which is fastened to the sleeve 82, will cause this sleeve to rotate, and since the sleeve 81 is now held stationary by the brake wheel 83 the nut 81 will then commence to travel along the shaft toward the left. In the same manner the rotation of the part 114, which is keyed to the sleeve 68, will cause the nut 69 to travel toward the left along the sleeve 68, since the brake wheel 73 is also held stationary and the nut 69 is threaded upon the sleeve 68. The rotation of the part 118, which is keyed to the shaft 86, will cause the rotation of this shaft and since the hub of the lever 92 is in threaded engagement with the threaded shaft 86, this lever 92 will also move along the shaft at the same speed as the sleeves 69 and 81; or in other words, the entire braking mechanism will start to move along their respective shafts to the left, as viewed in Fig. 3, which will cause the vanes 60 and 61 to expand the segments of the pulley upon the shaft 65 and the vanes 75 and 76 to contract the segments of the pulley upon the shaft 74. It is to be noted that during this movement, the ball bearings take up the thrust of the vanes 60, 61, etc. As soon as the speed ratio has been properly changed the hand lever 103 is permitted to return to its normal position. The pin 137 which, under the action of its centralizing springs will first be released, will then return to its normal position and throw out the driving connection to the sprocket wheels; this will stop the further rotation of the sleeves 82 and 68. The brake wheels, however, will be still held by the brake bands and the nuts 68 and 81 will turn loosely upon their respective shafts. The further movement of the hand lever to its normal position will release the brake bands and the parts will again be in their normal position.

When the hand lever is moved in the opposite direction to cause the pin 151 to be moved downwardly, the rock shaft 150 will be thrown in a reverse direction and the sprocket wheels 106, 108 and 107 will be driven through the sprocket wheel 124, which is now clutched to the clutch 121 keyed to the shaft 74, the sprocket wheel 124 driving in turn the sprocket wheel 160 which carries upon its shaft the sprocket wheel 161 which drives the chain 108 and the sprocket wheels referred to, in the opposite direction. It will be noted that due to the size of the sprocket wheel 161 the travel of the chain, or the speed of rotation of the sprocket wheels 106, 107, 108, will be greater than when the sprocket wheel 111 is connected to the drive shaft 74. However, this is of no importance and the two sprocket wheels 160 and 161 may be made of the same diameter, if necessary.

I claim:

1. The combination of a shaft, an expansible pulley on said shaft, a member rotatably mounted on said shaft and held against longitudinal movement, a sleeve surrounding and adapted to be longitudinally moved by the rotation of said member, and cam means connected to said sleeve and operative to expand and contract said pulley.

2. The combination of a pair of shafts having pulleys thereon with radially expansible segments and a set of vanes longitudinally movable along each of said shafts for expanding and contracting the segments of each of the pulleys, with a traveling member mounted upon each shaft and connected to the vanes, means including a member having a relative rotation with respect to said traveling member for causing said latter member to move along the shaft, and sprocket wheels associated with each of said shafts for rotating one of said members.

3. The combination of a pair of shafts having pulleys thereon with radially expansible segments and a set of vanes longitudinally movable along each of said shafts for expanding and contracting the segments of each of the pulleys, with a sleeve rotatably mounted upon each of said shafts, a traveling member adapted to move along said sleeve upon relative rotation of said member and sleeve, and sprocket wheels associated with each of said shafts for simultaneously rotating the members.

4. The combination of a pair of shafts having pulleys thereon with radially expansible segments and a set of vanes longitudinally movable along each of said shafts for expanding and contracting the segments of each of the pulleys, with a sleeve loosely mounted upon said shaft, a traveling member mounted upon said sleeve and adapted to move along said sleeve upon rotation thereof, an anti-friction bearing having its inner ring secured to said traveling member and its outer ring secured to said vanes, and means associated with each of said shafts for rotating said sleeves.

5. The combination of a pair of shafts having pulleys thereon with radially expansible segments and a set of vanes longitudinally movable along each of said shafts for expanding and contracting said segments of each of the pulleys, with a sleeve loosely mounted upon each of said shafts and held against longitudinal movement, a traveling member mounted upon said sleeve and adapted to move therealong upon rotation of said sleeve, connections between said traveling member and said vanes permitting relative rotation of said parts but constraining them to move longitudinally together, and means associated with each of said sleeves for rotating them to cause said traveling members to actuate said vanes.

6. The combination of a pair of shafts having pulleys thereon with radially expansible segments and a set of vanes longitudinally movable along each of said shafts for expanding and contracting said segments of each of the pulleys, with a sleeve loosely mounted upon each of said shafts and having end bearings against the pulley and the frame supporting said shafts, a traveling member threaded upon said sleeve, connections between said traveling member and said vanes permitting relative rotation of said parts but constraining them to move longitudinally together, and means associated with each shaft for rotating said sleeves to cause said traveling members to move therealong.

7. The combination of a pair of shafts having pulleys thereon with radially expansible segments and a set of vanes longitudinally movable along each of said shafts for expanding and contracting said segments of each of the pulleys, with a sleeve mounted for rotation upon each of said shafts but held against longitudinal displacement, a traveling member in threaded engagement with said sleeve, said traveling member and sleeve normally rotating together and means for first stopping the rotation of each of said traveling members and for thereafter rotating said sleeves to cause each of said traveling members to move along its respective sleeve.

8. The combination of a pair of shafts having pulleys thereon with radially expansible segments and a set of vanes longitudinally movable along each of said shafts for expanding and contracting the segments of each of the pulleys, with a sleeve rotatably mounted upon each of said shafts, a traveling member mounted upon said sleeve and normally rotating therewith, means for controlling the rotation of each of said traveling members, and means for rotating said sleeves.

9. The combination of a pair of shafts having pulleys thereon with radially expansible segments and a set of vanes longitudinally movable along each of said shafts for expanding and contracting the segments of each of the pulleys, with a sleeve mounted for rotation upon each of said shafts but held against longitudinal displacement, a member threaded onto each of said sleeves, braking mechanism for controlling the rotation of each of said members, connections between each of said members and a set of vanes, and driving mechanism for rotating said sleeves.

10. The combination of a pair of shafts having pulleys thereon with radially expansible segments and a set of vanes longitudinally movable along each of said shafts for expanding and contracting the segments of each of the pulleys, with a sleeve mounted for rotation on each of said shafts and normally movable relatively thereto but held against longitudinal displacement, a member threaded onto each of said sleeves, connections between each of said members and one set of vanes, braking mechanism associated with each of said members, driving mechanism for rotating said sleeves, and means for first actuating the braking mechanism and then actuating said driving mechanism.

11. The combination of a pair of shafts having pulleys thereon with radially expansible segments and a set of vanes longitudinally movable along each of said shafts for expanding and contracting the segments of each of the pulleys, with a sleeve rotatably mounted on each of said shafts and normally movable relatively thereto but held against longitudinal displacement, a member threaded onto each of said sleeves, clutches to lock said members to the shafts, braking mechanism for controlling the rotation of each of said members, a driving mechanism for rotating said sleeves, and means for first actuating said braking mechanism and then actuating said clutches.

12. The combination of a pair of shafts having pulleys thereon with radially expansible segments and a set of vanes longitudinally movable along each of said shafts for expanding and contracting the segments of each of the pulleys, with a sleeve rotatably mounted on each of said shafts and normally movable relatively thereto but held against longitudinal displacement, a member threaded onto each of said sleeves, clutches to lock said members to the shafts, braking mechanism for controlling the rotation of each of said member, a driving mechanism for rotating said sleeves in either direction, and means for first actuating said braking mechanism and then actuating said clutches.

13. The combination of a pair of shafts having pulleys thereon with radially expansible segments and a set of vanes longitudinally movable along each of said shafts for expanding and contracting the segments of each of the pulleys, with a sleeve rotatably mounted on each of said shafts and normally movable relatively thereto but held against longitudinal displacement, a member threaded onto each of said sleeves, clutches to lock said members to the shafts, braking mechanism for controlling the rotation of each of said members, a driving mechanism for rotating said sleeves, and manually controlled means for first actuating said braking mechanism and then actuating said clutches.

14. The combination of a pair of shafts having pulleys thereon with radially expansible segments and a set of vanes longitudinally movable along each of said shafts for expanding and contracting the segments of each of the pulleys, with a sleeve rotatably mounted on each of said shafts and normally movable relatively thereto but held against longitudinal displacement, a member threaded onto each of said sleeves, clutches to lock said members to the shafts, braking mechanism for controlling the rotation of each of said members, a driving mechanism for rotating said sleeves in either direction, and manually controlled means for first actuating said braking mechanism and then actuating said clutches.

15. The combination of a pair of shafts having pulleys thereon with radially expansible segments and a set of vanes longitudinally movable along each of said shafts for expanding and contracting the segments of each of the pulleys, with a sleeve mounted for rotation on each of said shafts but held against longitudinal displacement, a member threaded onto each of said sleeves, and anti-friction bearing associated with each member having its inner bearing ring secured to said member and its outer bearing ring connected to a set of vanes, braking mechanism associated with each of said members, driving mechanism for rotating said sleeves, and means for first actuating the braking mechanism and then actuating said driving mechanism.

16. The combination with a pair of shafts, of an expansible pulley on each of said shafts, a belt imparting the rotation of one of said pulleys to the other of said pulleys, members rotatably mounted on said shafts and held against longitudinal movement, sleeves surrounding and adapted to be longitudinally moved by the rotation of said members, means connected to said sleeves for expanding and contracting said pulleys, and means for simultaneouly actuating said members to expand one of said pulleys while contractng the other of said pulleys.

In witness whereof I subscribe my signature.

WILLIAM BUYERS DUNBAR.

Copies of this patent may be obtained for five cents each, by addressing the "Commissioner of Patents, Washington, D. C."